(12) United States Patent
Suzuki (10) Patent No.: US 7,933,458 B2
(45) Date of Patent: Apr. 26, 2011

(54) IMAGE DECODER, IMAGE DECODING METHOD AND COMPUTER PROGRAM PRODUCT FOR THE SAME

(75) Inventor: Kojiro Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 961 days.

(21) Appl. No.: 11/753,288

(22) Filed: May 24, 2007

(65) Prior Publication Data

US 2007/0274600 A1    Nov. 29, 2007

(30) Foreign Application Priority Data

May 25, 2006 (JP) ............................. P2006-145827

(51) Int. Cl.
G06K 9/36 (2006.01)
G06K 9/46 (2006.01)
G06K 9/38 (2006.01)

(52) U.S. Cl. ......... 382/238; 382/232; 382/239; 382/251

(58) Field of Classification Search .................. None
See application file for complete search history.

(56) References Cited

U.S. PATENT DOCUMENTS

| | | | |
|---|---|---|---|
| 5,974,184 A * | 10/1999 | Eifrig et al. | 382/236 |
| 6,134,269 A * | 10/2000 | Puri et al. | 375/240.03 |
| 6,385,242 B1 * | 5/2002 | Chen | 375/240.03 |
| 6,850,648 B2 * | 2/2005 | Suzuki | 382/233 |
| 7,148,822 B2 * | 12/2006 | Suzuki | 341/67 |
| 2003/0118239 A1 * | 6/2003 | Suh et al. | 382/238 |
| 2003/0152149 A1 * | 8/2003 | Denolf | 375/240.24 |
| 2006/0222064 A1 * | 10/2006 | Sherigar et al. | 375/240.03 |
| 2006/0282237 A1 * | 12/2006 | Xiao et al. | 703/2 |

OTHER PUBLICATIONS

International Standard ISO/IEC 14496-5, coding of audio-visual objects, part 5: reference software. Apr. 1, 2004.*
Cupak et al. "Chapter 7: MPEG-4 video decoder" in "System level design of reconfigurable systems-on chips", 2005 Springer.*
Wang Lin "MPEG-4 Video Coding Algorithm: Implementation and Performance Evaluation", Project Report, University of Alberta, 2001.*
International Standard, Information technology—Coding of audio-visual objects—Part 2: Visual, ISO/IEC 14496-2 Second Edition (2001), Dec. 1, 2001, pp. 169-175 and cover page, Section 7.4.3-7. 4.4.4.
International Standard, Information technology—Coding of audio-visual objects—Part 5: Reference Software, ISO/IEC 14496-5 Second Edition (2001), Dec. 15, 2001, (Not a Document, Cover Page Only).

* cited by examiner

Primary Examiner — Samir A Ahmed
Assistant Examiner — Li Liu
(74) Attorney, Agent, or Firm — Oblon, Spivak, McClelland, Maier & Neustadt, L.L.P.

(57) ABSTRACT

According to an embodiment of the invention, there is provided an image decoder for decoding encoded image data in an image block unit, including: a storage device configured to store a DC component of a past image block coefficient as a prediction value; a predict circuit configured to predict a DC component of a current image block coefficient using the prediction value; an inversely quantizing circuit configured to inversely quantize an image block coefficient outputted from the predict circuit; and a saturation processing circuit to execute a saturation processing of an image block coefficient outputted from the inversely quantizing circuit. A DC component of the image block coefficient outputted from the inversely quantizing circuit and a DC component of the image block coefficient after execution of the saturation processing are respectively inputted to the storage device.

9 Claims, 10 Drawing Sheets

IMAGE DECODER, IMAGE DECODING METHOD AND COMPUTER PROGRAM PRODUCT FOR THE SAME

CROSS-REFERENCE TO RELATED APPLICATIONS

This application is based on and claims the benefit of priority from the prior Japanese Patent Application No. 2006-145827, filed on May 25, 2006; the entire contents of which are incorporated herein by reference.

BACKGROUND

1. Technical Field

The present invention relates to an image compressing technology and, specifically, relates to an image decoder and an image decoding method for decoding image data compressed according to the international standardizing organization/international electric standard conference (ISO/IEC) 14496 (hereinafter, referred to as the MPEG-4).

2. Description of Related Art

According to a time-varying image encoding method including the MPEG-4, when data compressing image data or a differential image between the image data and predictive image data, there is used a discrete cosine transformation (DCT) processing. Specifically, a DCT processing is enforced on the image data or differential image data and the resultant DCT coefficient is encoded after quantized.

In the MPEG-2, of two or more blocks obtained by dividing an image, a difference between the direct current (DC) components of the mutually adjoining blocks in the horizontal direction is encoded. On the other hand, in the MPEG-4, for an intra encoding processing, there is employed the adaptive AC/DC prediction method which adaptively prediction encodes the DC component and quantized alternating current (AC) component of blocks adjoining in the horizontal direction or in the vertical direction, thereby enhancing encoding efficiency (for example, see ISO/IEC 14496-2 and ISO/IEC 14496-5).

In the adaptive DC prediction method, the varying amounts of the DC components of mutually adjoining left block and left upper block are compared with the varying amounts of the DC components of mutually adjoining left upper block and upper block, the DC component of the current block is predicted from the direction that is smaller in inclination. When this method is used, prediction can be executed from the pixels that have a high correlation between them, thereby being able to enhance the ratio of compression. According to the above comparison results, it is decided which one of "horizontal prediction" using horizontally adjoining blocks and "vertical prediction" using vertically adjoining blocks is executed.

On the decoding side, after inverse quantization, the DC and AC components are rounded into the dynamic range of the DCT coefficients by a saturation processing. After then, an inverse DCT processing is enforced to reproduce the DC and AC components. Here, the "saturation processing" means a processing which executes a clip operation on the DC and AC components after inversely quantized in such a manner that the components are restricted to a predetermined range.

However, as regards the saturation processing, the MPEG-4 standards also give an ambiguous expression as to the saturation processing, which gives rise to lack of unity in encoding many MPEG-4 derivative video codes which are popular on the market. Specifically, in the post processing of the saturation processing, for a processing referring to such value (the inverse DCT and AC/DC prediction), the regulation states clearly that a saturation processing should be enforced on the inverse DCT, whereas it is not clear whether such saturation processing should be applied to the AC/DC prediction as well or not.

In fact, there is inconsistency even in the separate volumes of the standards. According to the ISO/IEC 14496-2 (Visual), we can read that the saturation processing should be executed; however, according to source codes contained in the ISO/IEC 14496-5 (Reference software), it is suggested that the saturation processing should not be executed. The following two types of applications coexist.

TABLE 1

| | Saturation Processing for inverse DCT | Saturation processing for AC/DC prediction | Cases employed |
|---|---|---|---|
| Related Art 1 | Yes | Yes | ISO/IEC 14496-2, etc. |
| Related Art 2 | Yes | No | ISO/IEC 14496-5, etc. |

The difference, generally, is not recognized so well. Or, even when such difference is recognized, it is often considered that such difference cannot develop into a problem. The reason for this is as follows: that is, even if the difference exceeds the range of −2048~+2047, an excess portion is limited to a minute value and thus, provided that the bit width of the register is sufficient, it is considered that such excess value cannot reach a visually recognizable level as a display pixel value.

However, when the DC component exceeds the given range, even if the excess value is minute (for example, only if it increases from +2047 to +2048), an analysis result obtained from size comparison in the adaptive AC/DC prediction process inherent to the MPEG-4 is caused to vary, which gives rise to an error in judging the horizontal prediction and vertical prediction. When an error occurs in the judgment as to the horizontal and vertical predictions, there is produced noise of a visually recognizable level due to the ill influence of the judgment error.

The occurrence of this phenomenon depends on a stream but is reproducible. Thus, when such noise occurs once, the noise remains on a screen until a next intra-VOP (I-VOP) appears (normally, in the range of about 1/30 sec. to 10 sec.).

As has been described above, when the image data encoded in conformity to the ISO/IEC 14496-2 are decoded in conformity to the ISO/IEC 14496-5, or when the image data encoded in conformity to the ISO/IEC 14496-5 are decoded in conformity to the ISO/IEC 14496-2, there is a problem that visually recognizable noise can occur on the screen.

SUMMARY

According to an embodiment of the invention, there is provided an image decoder for decoding encoded image data in an image block unit, comprising: a storage device configured to store a DC component of a past image block coefficient as a prediction value; a predict circuit configured to predict a DC component of a current image block coefficient using the prediction value; an inversely quantizing circuit configured to inversely quantize an image block coefficient outputted from the predict circuit; and a saturation processing circuit to execute a saturation processing of an image block coefficient outputted from the inversely quantizing circuit. A DC component of the image block coefficient outputted from the inversely quantizing circuit and a DC component of the image block coefficient after execution of the saturation processing are respectively inputted to the storage device.

BRIEF DESCRIPTION OF THE DRAWINGS

In the accompanying drawings.

DESCRIPTION OF THE EMBODIMENTS

Next, description will be given below of first to third embodiments of the invention with reference to the accompanying drawings. In the description of the drawings in the following first to third embodiments, the same or similar portions thereof are given the same or similar designations.

First Embodiment

Figure 1:
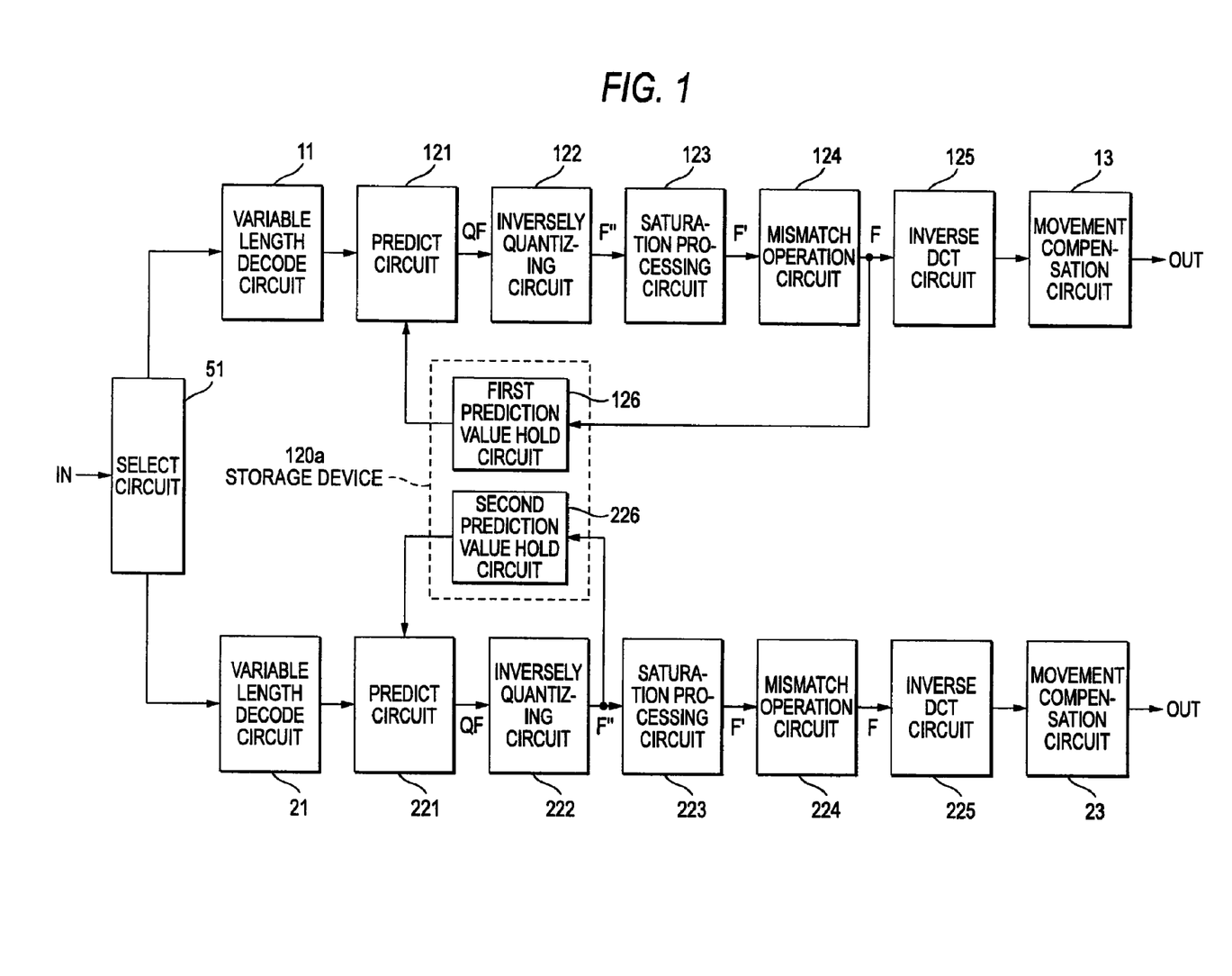
FIG. 1 is an exemplary block diagram of the structure of an image decoder according to a first embodiment of the invention.

An image decoder according to the first embodiment of the invention, as shown in FIG. 1, is an image decoder which decodes encoded image data IN in an image block unit. The present image decoder includes a storage device 120a for storing the prediction value of a DC component obtained from a past image block, predict circuits (AC/DC predict circuits) 121, 221 for predicting the DC component of a current image block using a prediction value, inversely quantizing circuits 122, 222 for inversely quantizing image block coefficients QF outputted from the predict circuits 121, 221, and saturation processing circuits 123, 223 for saturation processing image block coefficients F''' outputted from the inversely quantizing circuits 122, 222, in which, into the storage device 120a, there are inputted the DC component of the image block coefficient F''' outputted from the inversely quantizing circuit 222 and the DC component of an image block coefficient F (or F') after saturated processed, respectively.

The storage device 120a holds selectively either the DC component of the image block coefficient F (or F') after saturation processed or the DC component of the image block coefficient F''' not saturation processed. Therefore, the storage device 120a can be used optimally with respect to the respective encoded image data IN that have been encoded in image encoders respectively using different image encoding methods.

Figure 2:
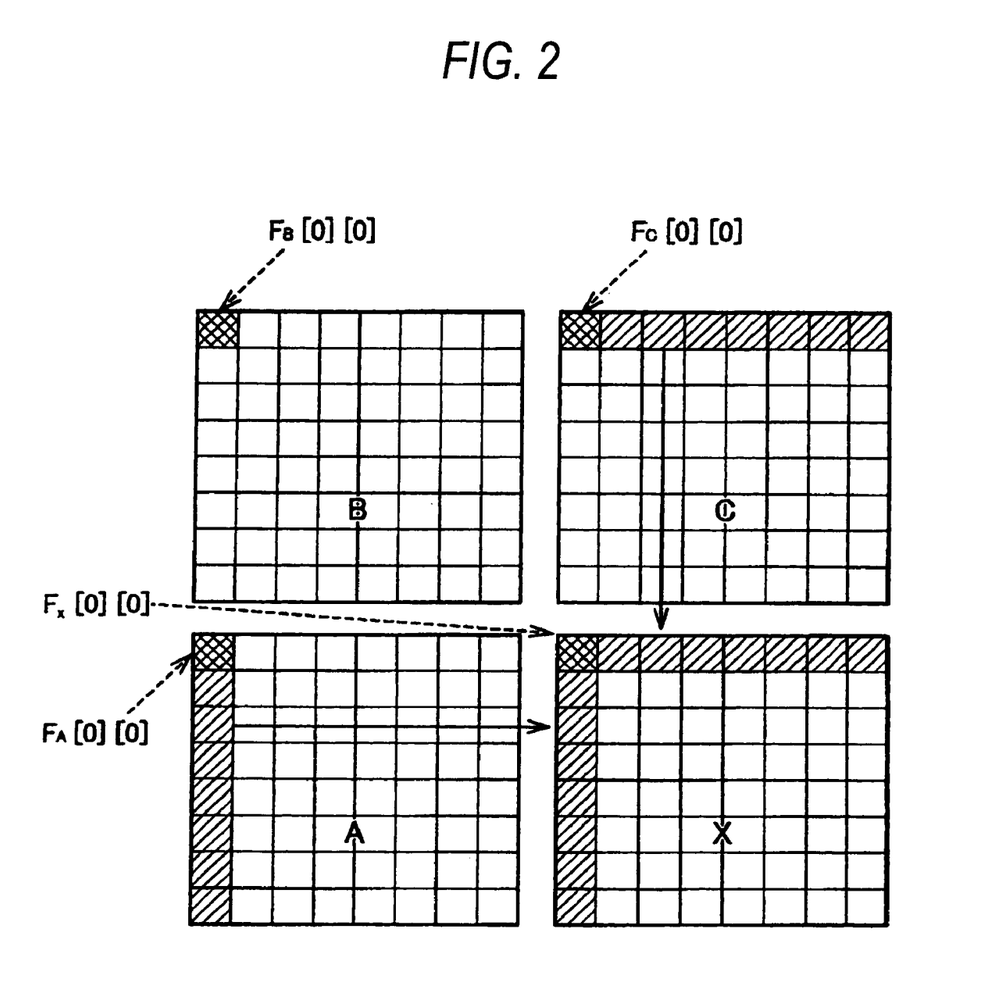
FIG. 2 is an exemplary typical view to explain the function of a predict circuit according to the first embodiment.

Here, description will be given below of a DC prediction processing to be executed by the predict circuits 121, 221 with reference to FIG. 2. Where X expresses a current image block, the following comparison processing is executed not only on variations in the DC component $F_A$ [0] [0] of a left image block A and the DC component $F_B$ [0] [0] of a left upper image block B but also on variations in the DC component $F_B$ [0] [0] of the left upper image block B and the DC component $F_C$ [0] [0] of an upper image block C, while these blocks respectively adjoin the current image block X:

[Numeric Expression 1]

if $(|F_A[0][0] - F_B[0][0]| < |F_B[0][0] - F_C[0][0]|)$ predict from block $C$   // vertical prediction              (1)

else predict from block $A$   // horizontal prediction Since which one of the horizontal prediction and the vertical prediction is to be executed is judged in this manner, the DC component $F_X$[0] [0] of the current image block X can be predicted from a direction in which a difference between the current image block and the image block B is larger (therefore, the inclination of the image block B with respect to the current image block X is assumed to be small).

In the AC prediction processing, a difference between the value of the upper-most array of DCT coefficient matrices or the left-most line thereof and the left image block A or upper image block C is encoded to thereby reduce the encoding amount. The decision as to the horizontal prediction and vertical prediction depends on the prediction direction of the DC prediction.

Therefore, for the encoded image data IN encoded in conformity to different encoding methods, when, in the numeric expression (1), the horizontal prediction and vertical prediction are judged wrong, such wrong judgment has an influence not only on the DC component but also on the AC component. However, since the storage device 120a is able to hold not only the DC component of the image block coefficient F (or F') on which a saturation processing has been enforced but also the DC component of the image block coefficient F''' on which the saturation processing has not been enforced, the horizontal prediction and vertical prediction can be judged accurately.

Further, the storage device 120a shown in FIG. 1 includes a first prediction value hold circuit 126 for holding as a prediction value the DC component of the image block coefficient F (or F') after saturation processed, and a second prediction value hold circuit 226 for holding as a prediction value the DC component of the image block coefficient F''' outputted from the inversely quantizing circuits 122, 222. Also, the first and second prediction value hold circuits 126, 226 are structured such that they can hold the AC component as well which are used in the AC prediction by the predict circuits 121, 221.

The saturation processing circuits 123, 223 enforce the following clip operation on the DCT coefficients (DC component and AC component) of the image block coefficients F''' after inversely quantized:

[Numeric Expression 2]

$$F'[v][u] = \begin{cases} +2047 & F''[v][u] > +2047 \\ F''[v][u] & -2048 \leq F''[v][u] \leq +2047 \\ -2048 & F''[v][u] < -2048 \end{cases} \quad (2)$$

In the numeric expression (2), because the value of "bits_per_pixel" is 8, the numeric expression (2) is equivalent to the following numeric expression (3).

[Numeric Expression 3]

$$F'[v][u] = \begin{cases} 2^{bits\_per\_pixel+3} & F''[v][u] > 2^{bits\_per\_pixel+3} - 1 \\ F''[v][u] & -2^{bits\_per\_pixel+3} \leq F''[v][u] \leq 2^{bits\_per\_pixel+1} - 1 \\ -2^{bits\_per\_pixel+3} & F''[v][u] < -2^{bits\_per\_pixel+3} \end{cases} \quad (3)$$

Therefore, the respective registers for the DCT coefficients in the first prediction value hold circuit 126 are encoded in 12 bits so that the range of −2048~+2047 can be stored. On the other hand, the respective registers for the DCT coefficients in the second prediction value hold circuit 226 are encoded in 13 or more bits (normally, about 16 bits or 32 bits).

To the inputs of the predict circuits (AC/DC predict circuits) 121, 221, there are connected the outputs of variable length decode circuits 11, 21 which variable length decode the encoded image data IN, respectively. Also, to the inputs of the variable length decode circuits 11, 21, there is connected the output of a select circuit 51. The select circuit 51, according to a select signal supplied by a user's select operation or the like, supplies the encoded image data IN to either the variable length decode circuit 11 or 21.

Also, in the MPEG-4 video standards, a reproduction processing is enforced on the respective frames of a time-varying image in an image block unit called a macro block. The macro block is composed of a brightness (Y) signal block having 16×16 pixels, a red color difference (Cr) signal block spatially coincident with the brightness (Y) signal block and having 8×8 pixels, and a blue color difference (Cb) signal block. By the way, the Y signal block may be processed in such a manner that it is divided to four image blocks each having 8×8 pixels.

In the MPEG-4 video standards, the image data are encoded or processed in the above-mentioned macro block unit. The encoding method is divided into two main methods which are respectively referred to as an intra encoding method (an intra mode) and a prediction encoding method (an inter mode). The intra encoding method, in which the DC component is predicted by the predict circuits 121, 221, is a spatial-direction data compression method in which, on the encoding side, the DCT processing is enforced on six encoding image block images each having 8×8 pixels to thereby quantize and encode the respective transformation coefficients.

When the prediction mode of the macro block is the intra encoding method, in the inversely quantizing circuits 122, 222 and inverse DCT circuits 125, 225, every image block having 8×8 pixels are inversely quantized and inverse DCT processed to thereby reproduce the macro block images. By the way, a mismatch circuit 124 is used to control a mismatch between the DCT processing on the encoding side and the inverse DCT processing on the decoding side. Since the DC components of the image block coefficients F' and F do not vary before and after the mismatch operation, it is not necessary to separate the image block coefficients F' and F from each other.

On the other hand, when the prediction mode of the macro block is the prediction encoding method, movement vector information is inputted to movement compensation circuits 13, 23. The movement compensation circuits 13, 23, according to a moving amount contained in the movement vector information, extract a prediction macro block from a frame memory (not shown) in which the decoded images of a previous frame are stored. Next, in the inversely quantizing circuits 122, 222 and inverse DCT circuits 125, 225, every image block having 8×8 pixels is inversely quantized and inverse DCT processed to thereby reproduce a differential macro block image. And, the prediction macro block image and differential macro block image are added together to thereby reproduce the macro block image. The thus reproduced macro block image is synthesized or combined with the decoded frame image, and the decoded frame image is stored into the frame memory for the prediction of a next frame.

Figure 3:
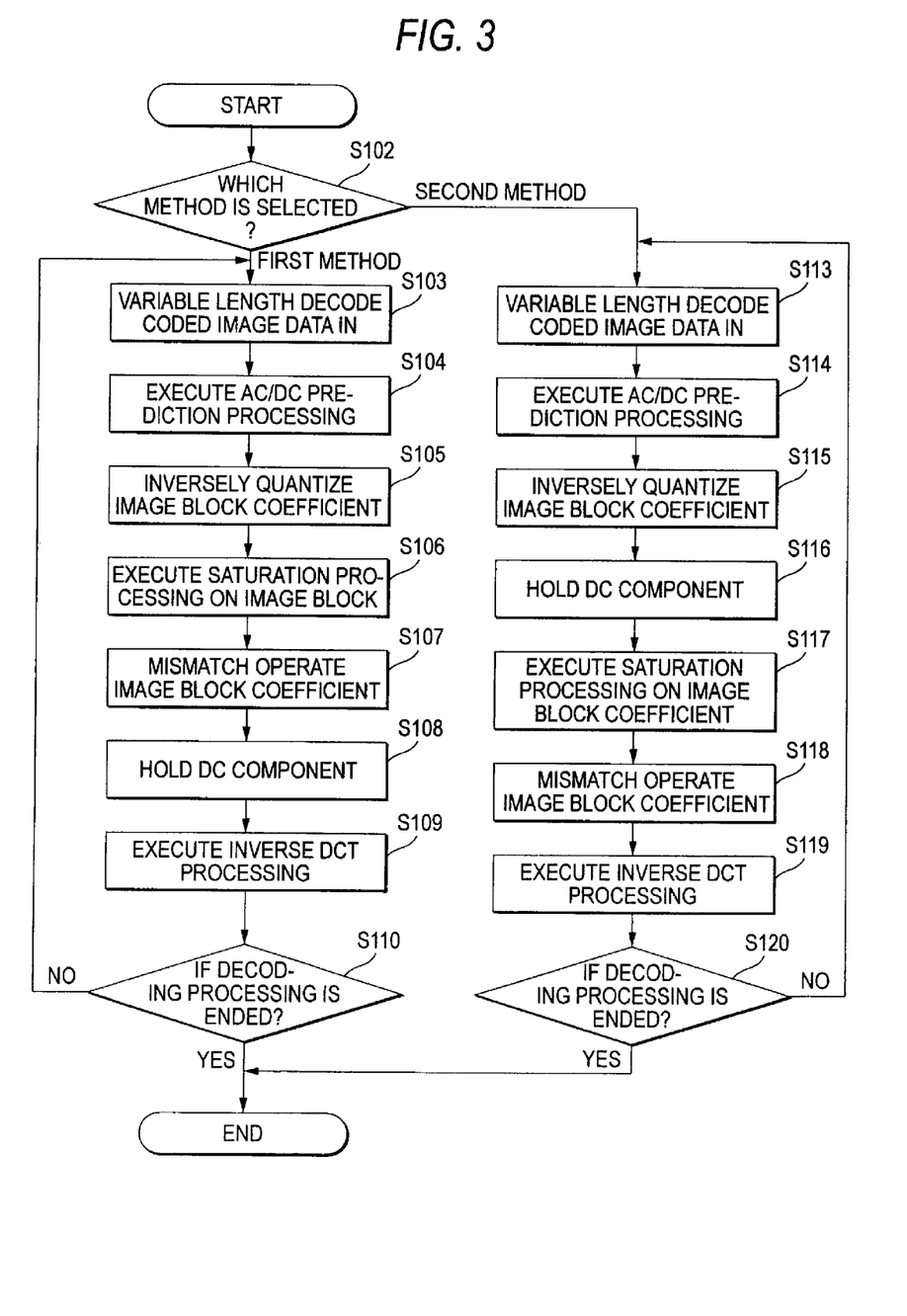
FIG. 3 is an exemplary flow chart of the operation of the image decoder according to the first embodiment.

Next, description will be given below of an example of the operation of the image decoder according to the first embodiment with reference to a flow chart shown in FIG. 3. Firstly, description will be given of a method for enforcing a saturation processing with respect to the AC/DC prediction according to the ISO/IEC 14496-2 or the like (which is hereinafter referred to as a first method). However, in the following description, there is taken a case in which the prediction mode is the intra encoding method.

In Step S102, when it is found that the processing method is the first method, the select circuit 51 supplies the encoded image data IN to the variable length decode circuit 11.

In Step S103, the variable length decode circuit 11 variable length decodes the encoded image data IN.

In Step S104, the predict circuit 121 executes an AC/DC prediction processing using the prediction values of the DC and AC components respectively held in the first prediction value hold circuit 126.

In Step S105, the inversely quantizing circuit 122 inversely quantizes the image block coefficients QF after execution of the AC/DC prediction processing.

In Step S106, the saturation processing circuit 123 saturation processes the image block coefficients F''' after execution of the inversely quantizing processing using the numeric expression (3).

In Step S107, the mismatch operation circuit 124 mismatch operates the image block coefficients F' after execution of the saturation processing.

In Step S108, the first prediction value hold circuit 126 holds the DC components of the image block coefficients F (or F') after execution of the saturation processing.

In Step S109, the inverse DCT circuit 125 executes an inverse DCT processing on the image block coefficients F after execution of the mismatch operation.

In Step S110, when it is judged that the decoding processing is to be ended, the decoding processing is ended. When continuing the decoding processing, the processing goes back to Step S103.

Next, description will be given below of a method in which a saturation processing is not enforced with respect to the AC/DC prediction in conformity to the ISO/IEC 14496-5 or the like (which is hereinafter referred to as a second method). However, there is taken here a case in which the prediction mode is the intra encoding method).

In Step S102, it is judged that the processing method is the second method, the select circuit 51 supplies the encoded image data IN to the variable length decode circuit 11.

In Step S113, the variable length decode circuit 21 variable length decodes the encoded image data IN.

In Step S114, the predict circuit 221 executes an AC/DC prediction processing using the prediction values of the DC and AC components respectively held in the second prediction value hold circuit 226.

In Step S115, the inversely quantizing circuit 222 inversely quantizes the image block coefficients QF after execution of the AC/DC prediction processing.

In Step S116, the second prediction value hold circuit 226 holds the DC components or the like after execution of the inversely quantizing processing.

In Step S117, the saturation processing circuit 223 saturation processes the image block coefficients F'" after execution of the inversely quantizing processing using the numeric expression (3).

In Step S118, the mismatch operation circuit 224 mismatch operates the image block coefficients F' after execution of the saturation processing.

In Step S119, the inverse DCT circuit 225 executes an inverse DCT processing on the image block coefficients F after execution of the mismatch operation.

In Step S120, when it is judged that the decoding processing is to be ended, the decoding processing is ended. When continuing the decoding processing, the processing goes back to Step S113.

As has been described in detail, according to the first embodiment, it is possible to obtain image reproduction having good image quality with no noise in both of two kinds of encoding methods which are generally used.

Modification of First Embodiment

Figure 4:
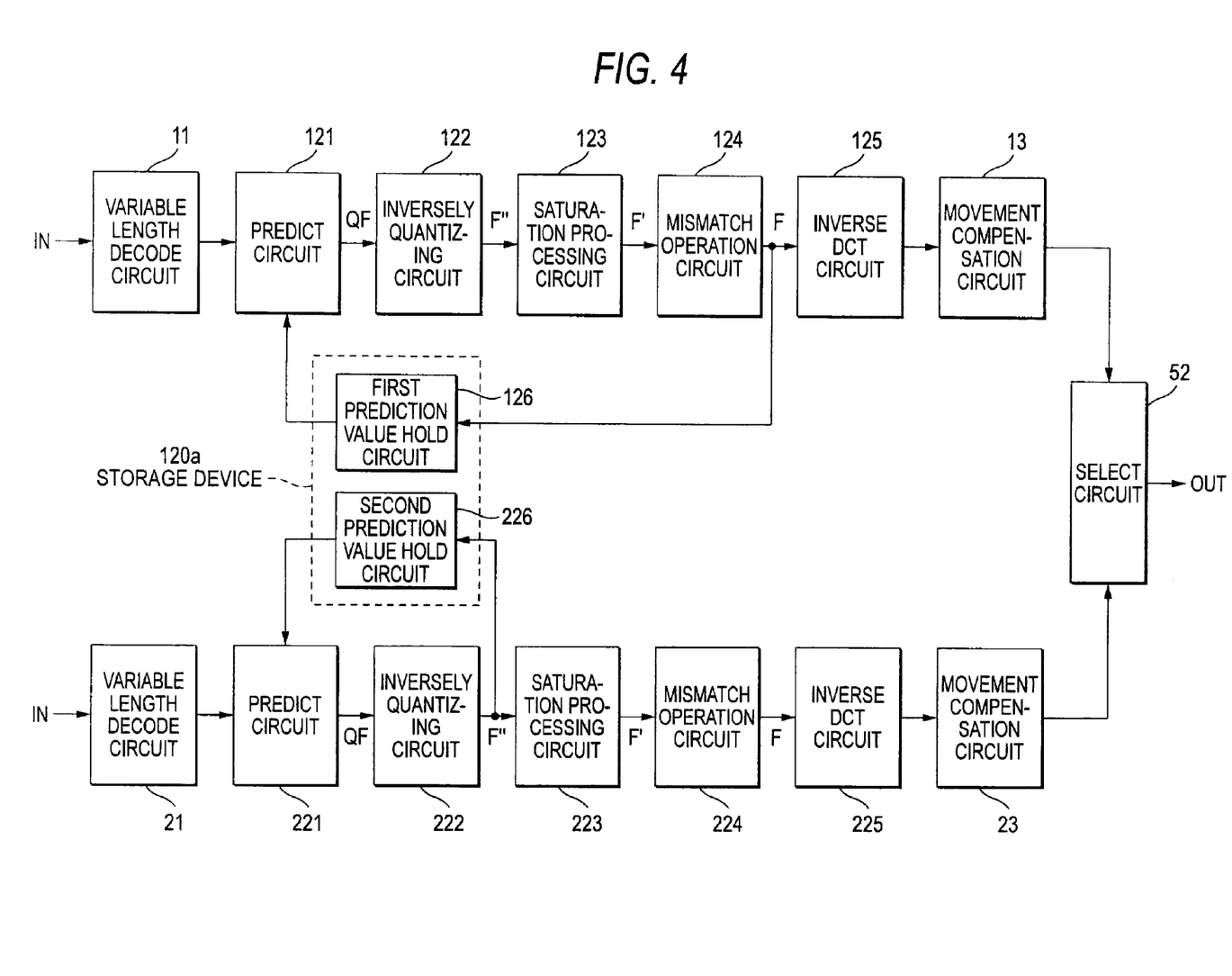
FIG. 4 is an exemplary block diagram of the structure of an image decoder according to a modification of the first embodiment.

A modification of the first embodiment, as shown in FIG. 4, is different from the first embodiment shown in FIG. 1 in that a select circuit 52 is connected to the output of the image decoder. The select circuit 52, according to a select signal supplied by user's select operation or the like, selects either the movement compensation circuit 13 or 23 and outputs the decoded image data OUT to the outside. According to the modification of the first embodiment, there can be obtained a similar effect to the first embodiment.

Second Embodiment

Since the image decoder according the above-mentioned first embodiment includes many duplicate devices (hardware), the areas of the chips are used wastefully and the costs thereof are expensive accordingly. In view of this, in the second embodiment, there is employed a structure in which the duplicate parts can be used in common.

Figure 5:
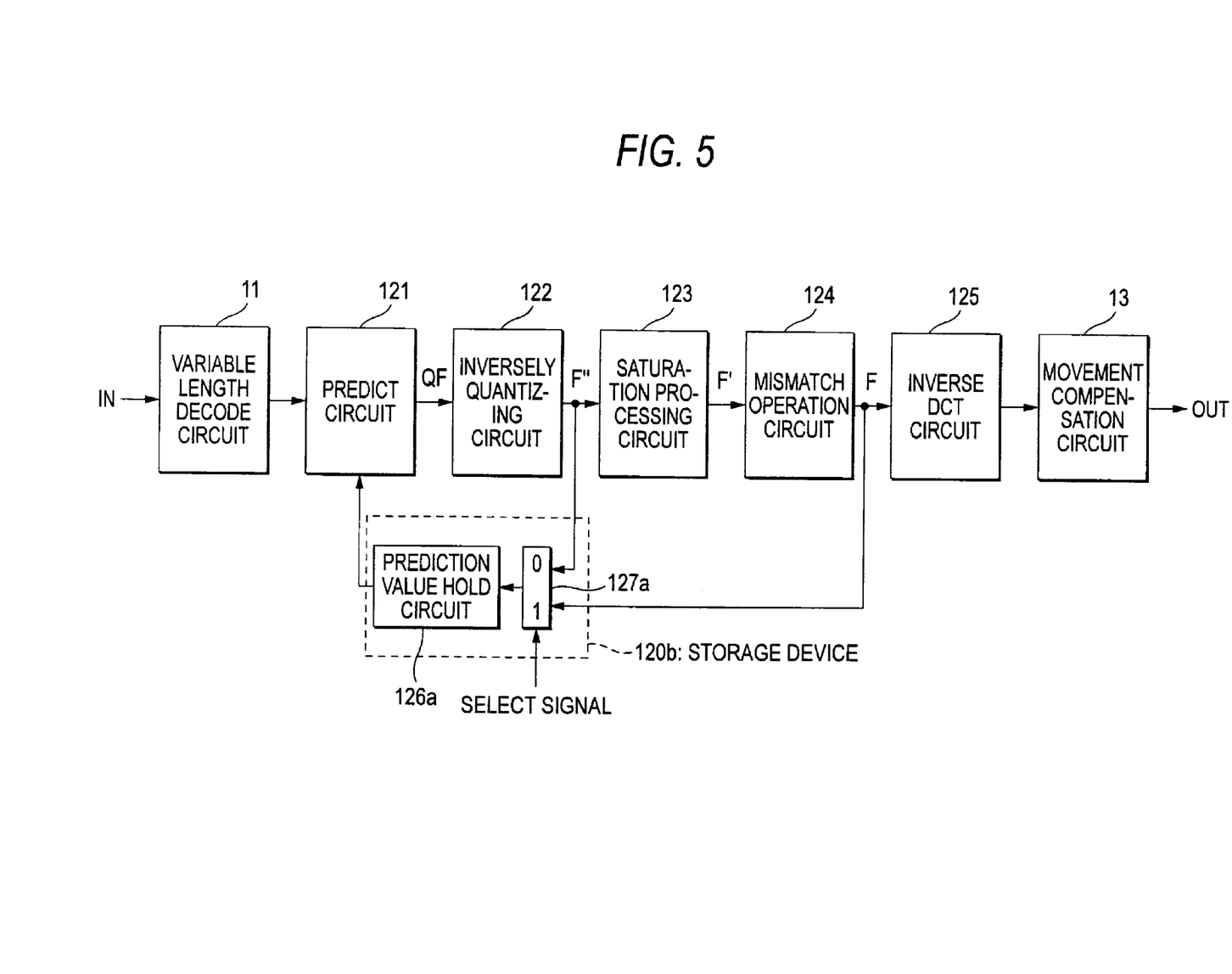
FIG. 5 is an exemplary block diagram of the structure of an image decoder according to a second embodiment of the invention.

An image decoder according to the second embodiment, as shown in FIG. 5, includes a storage device 120b for storing the prediction value of the DC component obtained from a past image block, a predict circuit 121 for predicting the DC component of a current image block using the prediction value, an inversely quantizing circuit 122 for inversely quantizing an image block coefficient QF outputted from the predict circuit 121, and a saturation processing circuit 123 for saturation processing an image block coefficient F'" outputted from the inversely quantizing circuit 122, in which, into the storage device 120b, there are inputted the respective DC components of the image block coefficient F'" outputted from the inversely quantizing circuit 122 and image block coefficient F (or F') after execution of the saturation processing.

Further, the storage device 120b includes a select circuit 127a which, according to a select signal, selects either the DC component of the image block coefficient F'" outputted from the inversely quantizing circuit 122 or the DC component of the image block coefficient F (or F') after execution of the saturation processing, and a prediction value hold circuit 126a for holding, as a prediction value, the DC component selected by the select circuit 127a. The select signal can be supplied, for example, by user's selecting operation or the like. Or, the select signal may also be set in the following manner: that is, the select signal is set by fixing a select signal pin when the storage device as a product is shipped from its manufacturer, and a decoder assembling maker selects one of the two functions of the storage device before the decoder is shipped.

Figure 6:
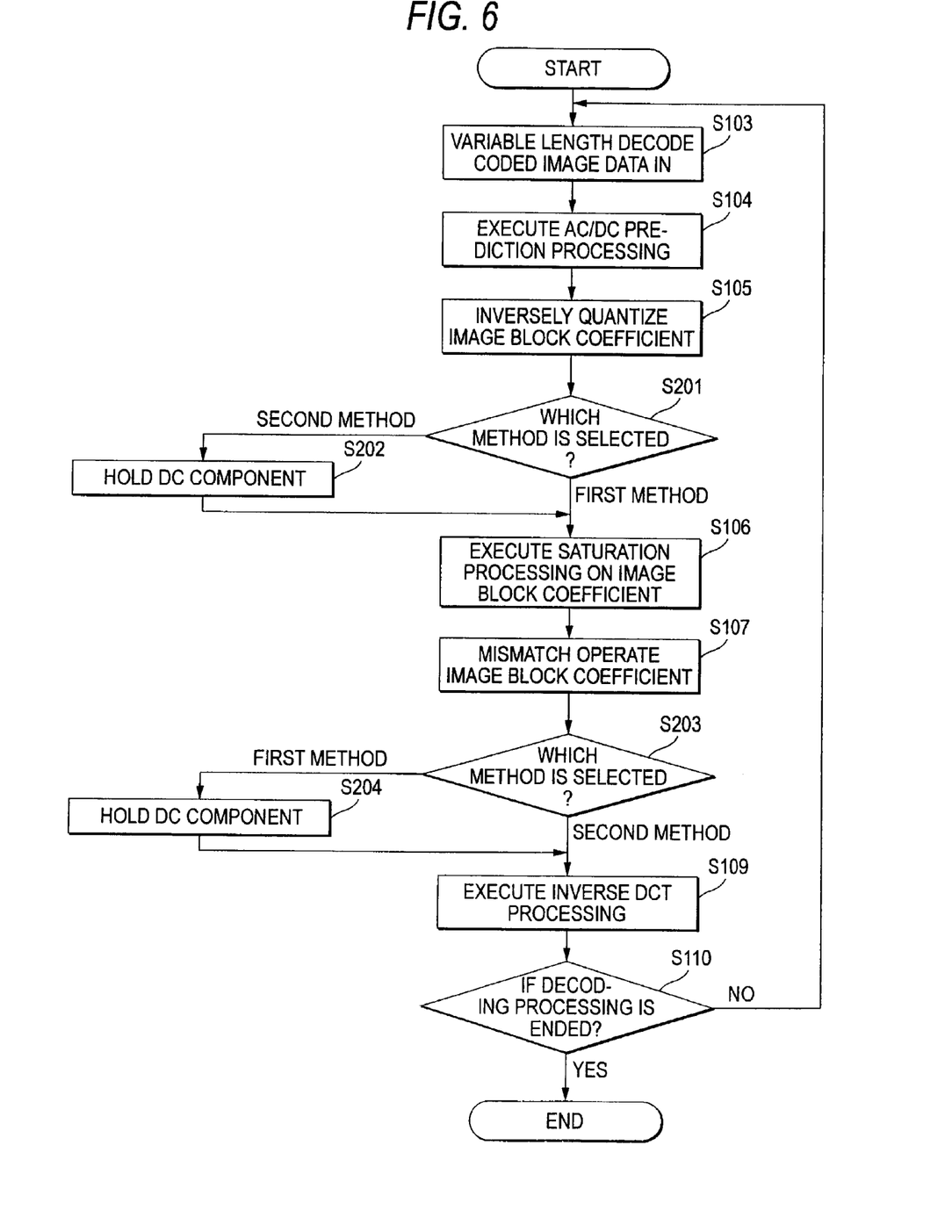
FIG. 6 is an exemplary flow chart of the operation of an image decoder according to the second embodiment.

Next, description will be given below of an example of the operation of the image decoder according to the second embodiment with reference to a flow chart shown in FIG. 6. However, there is taken here a case in which the prediction mode is the intra encoding method.

In Step S103, the variable length decode circuit 11 variable length decodes the encoded image data IN.

In Step S104, the predict circuit 121 executes an AC/DC prediction processing using the prediction values of the DC and AC components respectively held in the first prediction value hold circuit 126.

In Step S105, the inversely quantizing circuit 122 inversely quantizes the image block coefficients QF after execution of the AC/DC prediction processing.

In Step S201, when it is found that the first method is selected, the processing goes to Step S106 and, for the second method, the processing goes to Step S202. In Step S202, the DC component of the image block coefficient F'" after execution of the inversely quantizing processing or the like is held in the prediction value hold circuit 126a.

In Step S106, the saturation processing circuit 123 saturation processes the image block coefficients F'" after execution of the inversely quantizing processing using the numeric expression (3).

In Step S107, the mismatch operation circuit 124 mismatch operates the image block coefficients F' after execution of the saturation processing.

In Step S203, for the first method, the processing goes to Step S204 and, for the second method, the processing goes to Step S109. In Step S204, the prediction value hold circuit 126a holds the DC component of the image block coefficient F (or F') after execution of the saturation processing or the like.

In Step S109, the inverse DCT circuit 125 executes an inverse DCT processing on the image block coefficient F after execution of the mismatch operation.

In Step S110, when it is judged that the decoding processing is to be ended, the decoding processing is ended. When continuing the decoding processing, the processing goes back to Step S103.

In this manner, according to the second embodiment, since only a very small number of circuits are added to the image decoder, the influence of the added circuits on the area of the circuits and the operation speeds thereof can be neglected. Therefore, according to the second embodiment, a similar effect to the first embodiment can be obtained with a reduced number of pieces of hardware.

Modification of Second Embodiment

Figure 7:
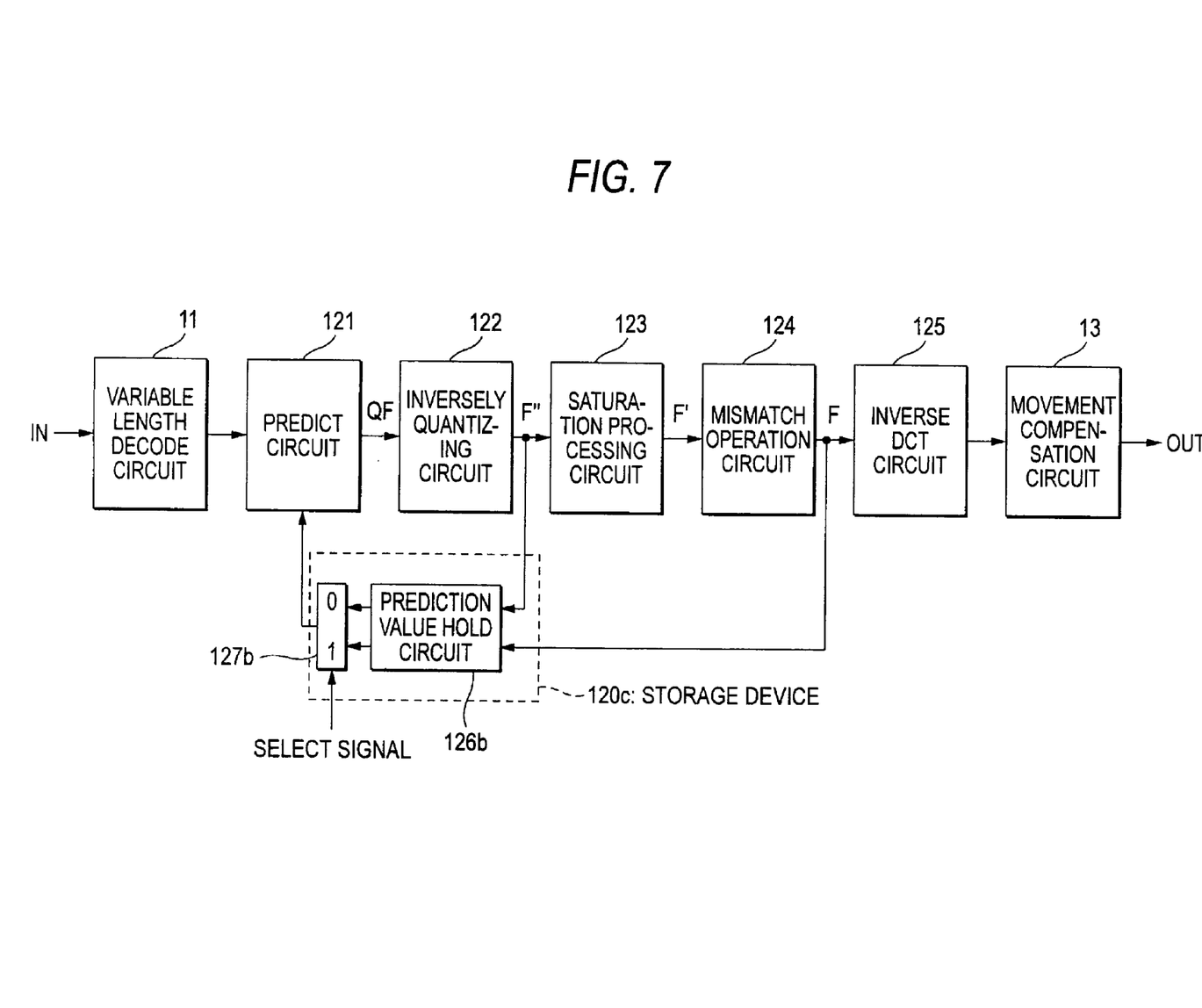
FIG. 7 is an exemplary block diagram of the structure of an image decoder according to a modification of the second embodiment.

In a modification of the second embodiment, as shown in FIG. 7, a storage device 120c is different in structure from the storage device 120b shown in FIG. 5. Specifically, the storage device 120c shown in FIG. 7 includes a prediction value hold circuit 126b for holding the respective DC components of the image block coefficient F" outputted from the inversely quantizing circuit 222 and image block coefficient F (or F') after execution of the saturation processing, and a select circuit 127b which, according to a select signal, selects one of the DC component of the image block coefficient F" and the DC component of the image block coefficient F (or F') held by the prediction value hold circuit 126b and outputs the selected DC component to the predict circuit 121. According to the modification of the second embodiment, there can be obtained a similar effect to the second embodiment.

Third Embodiment

Figure 8:
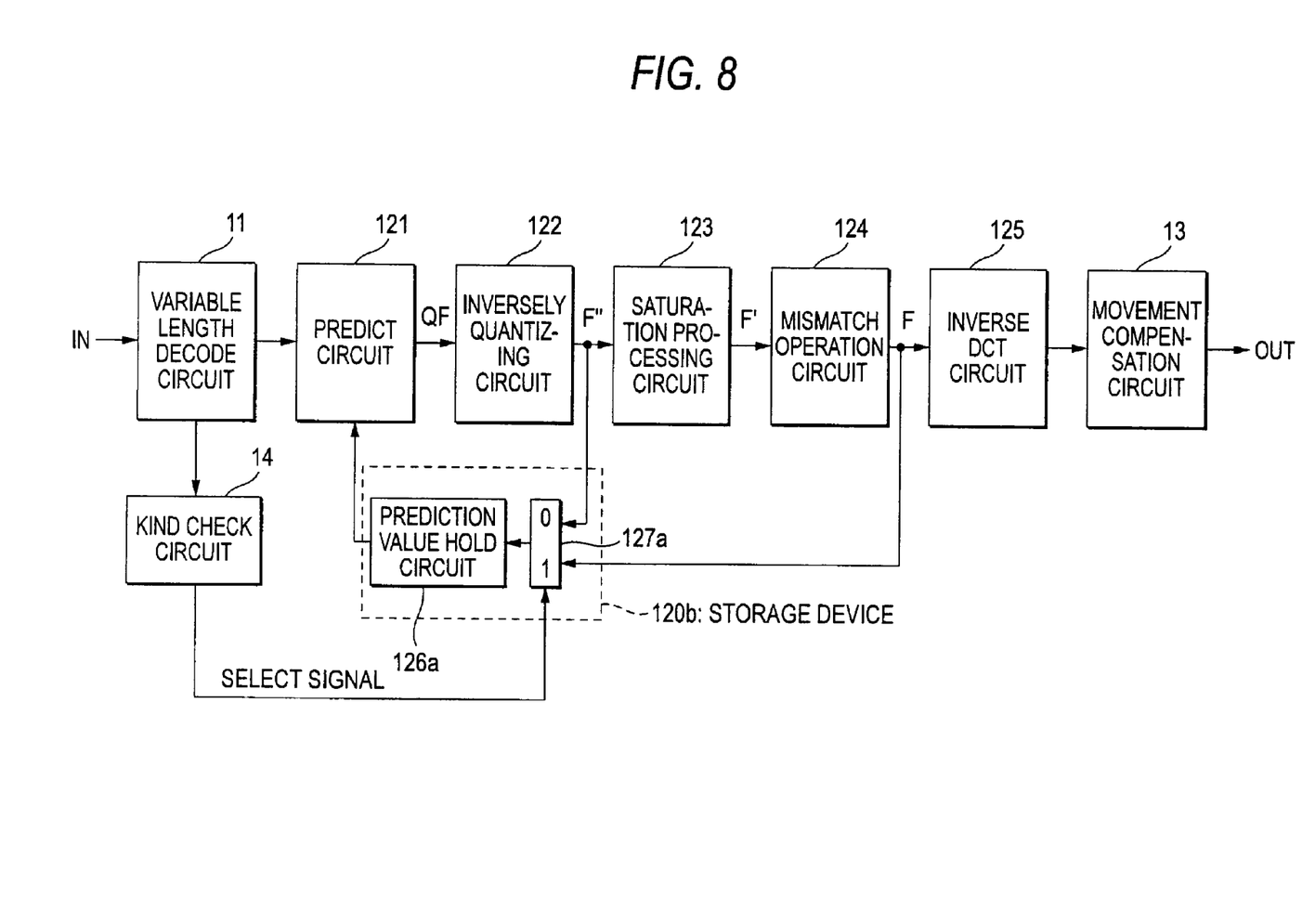
FIG. 8 is an exemplary block diagram of the structure of an image decoder according to a third embodiment of the invention.

In a third embodiment, as shown in FIG. 8, a select signal is controlled by the output of the variable length decode circuit 11. Whether a saturation processing is executed or not depends on the kind and version of an image decoder which has generated its stream (encoded image data IN). In many cases, such information is contained in the header or the like of the stream (encoded image data IN).

A kind check circuit 14 reads the kind and version of the stream (encoded image data IN) in the variable length decode circuit 11, and specifies it as a select signal. According to this structure, since the image encoder automatically judges which one of the two methods is to be selected depending on the stream (encoded image data IN), advantageously, there is eliminated the need for a user to be conscious of the kind of the stream (encoded image data IN). By the way, the kind check circuit 14 may also be disposed within the variable length decode circuit 11.

Figure 9:
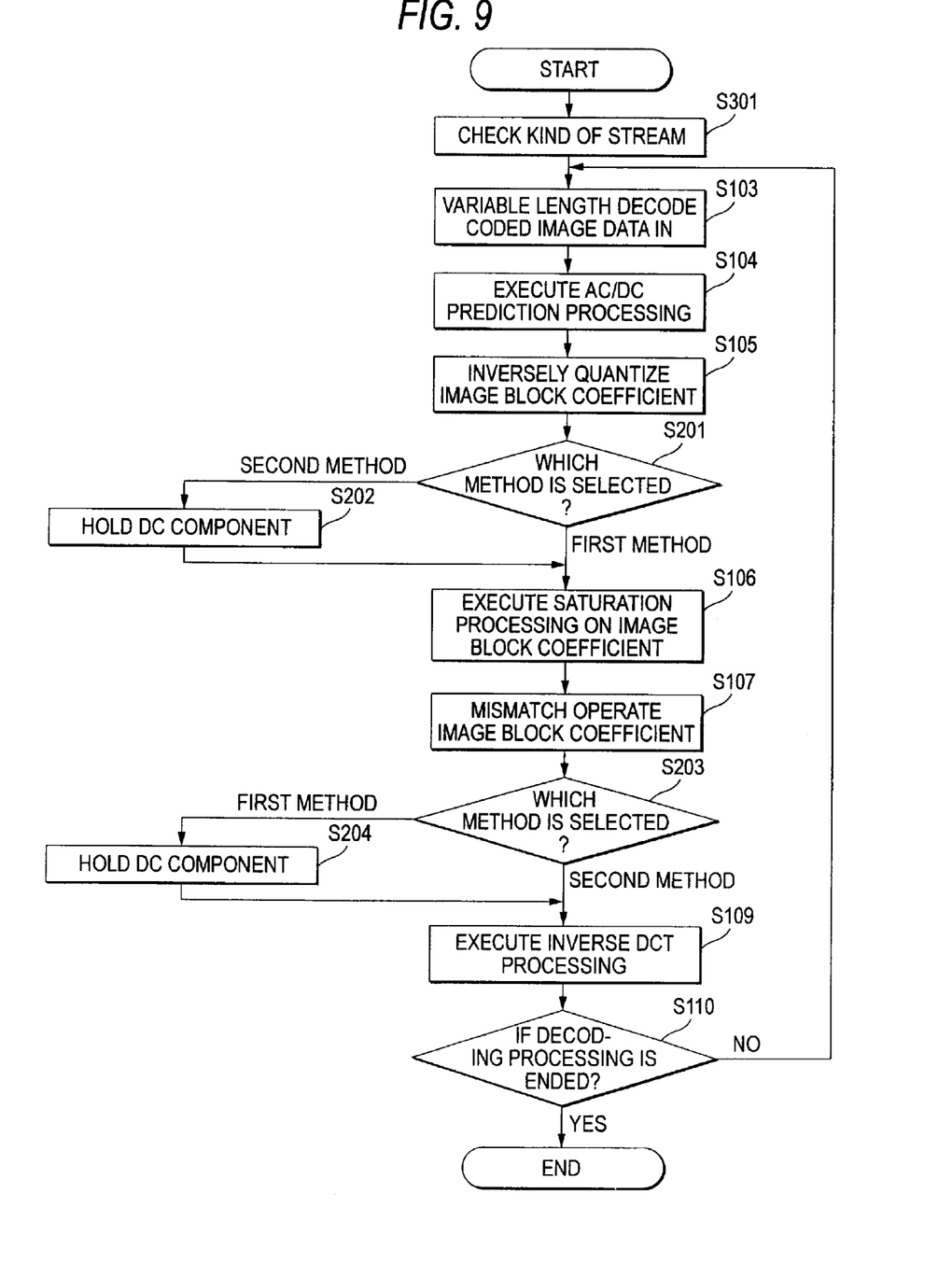
FIG. 9 is an exemplary flow chart of the operation of an image decoder according to the third embodiment.

Next, description will be given below of an example of the operation of the image decoder according to the third embodiment of the invention with reference to a flow chart shown in FIG. 9. However, the duplicated description of the duplicated portions of the operation thereof with the second embodiment is omitted here.

In Step S301, the kind check circuit 14 checks the stream (encoded image data IN) to which one of the first and second methods the stream corresponds. According to the check results of the kind check circuit 14, processings to be executed in steps specified in Steps S201 and S203 can be decided.

As described above, according to the third embodiment, since the decode circuit judges from the stream (encoded image data IN) which one of the two methods is to be selected, there is obtained an advantage that a user need not be conscious of the kind of the stream (encoded image data IN).

Modification of Third Embodiment

Figure 10:
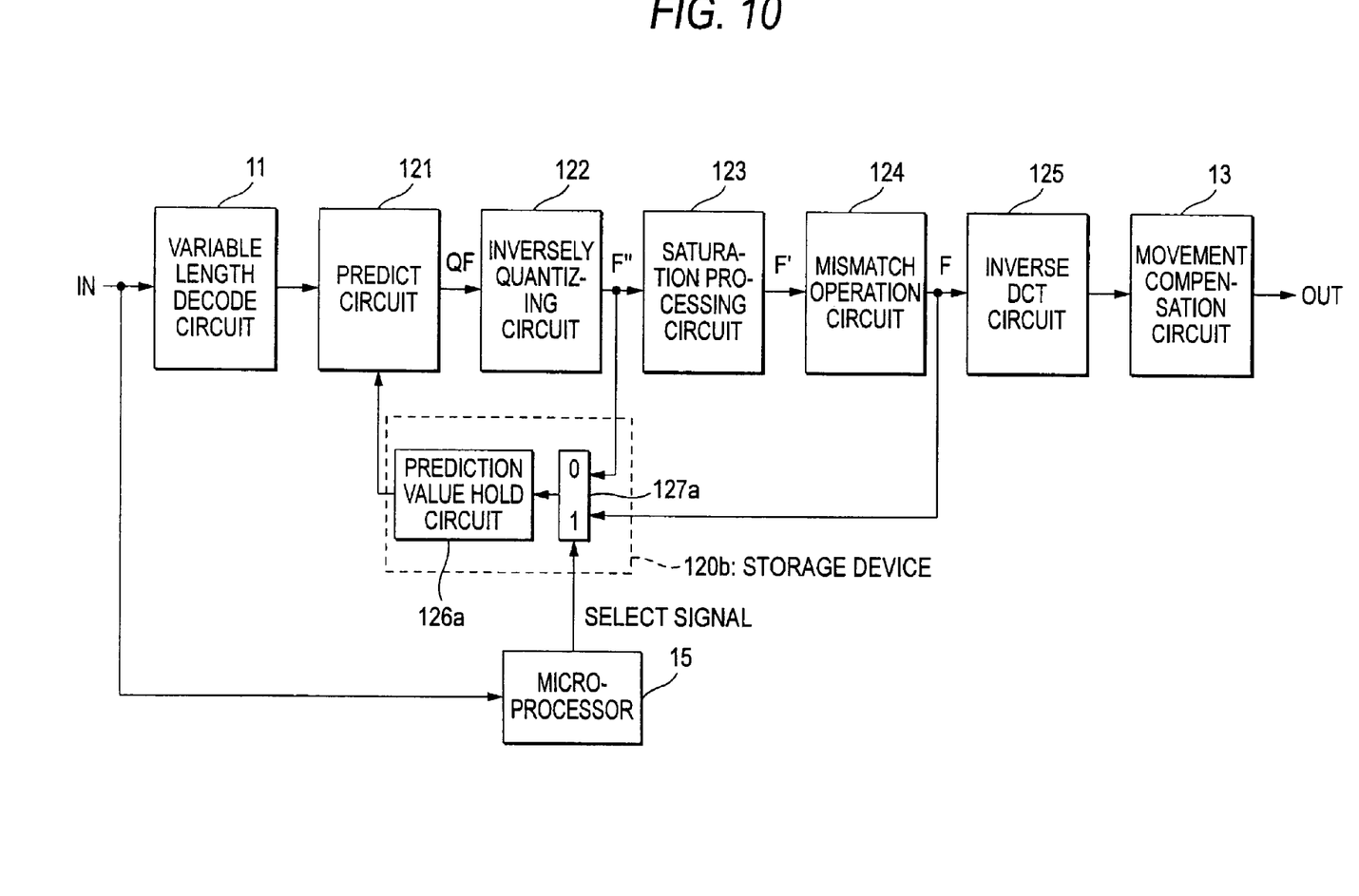
FIG. 10 is an exemplary block diagram of the structure of an image decoder according to a modification of the third embodiment.

In a modification of the third embodiment of the invention, as shown in FIG. 10, a select signal is controlled by an external device, that is, a microprocessor 15 (which is controlled by software). That is, information about the kind and version of the image encoding device is judged by software. This method is advantageous in that a judging algorithm can be changed by updating the software without changing the hardware, and is effective in coping with a new compression format.

According to the above-mentioned embodiments, there can be provided an image decoder which, in a decoding processing for decoding encoded image data encoded in conformity to different methods on the encoding side, can dissolve the occurrence of noise.

Other Embodiments

Although the invention has been described heretofore using the first to third embodiments thereof, it should not be understood that the description and drawings constituting part of the disclosure of the invention limit the invention. From the above disclosure, it is obvious to persons skilled in the art that various alternative embodiments and operating technologies are also possible.

For example, the above-mentioned image decoder may be a semiconductor integrated circuit which is integrated on a single semiconductor chip in a monolithic manner. Also, the above-mentioned image decoding processing may be a computer program and it can be executed by a computer.

It should be understood that the invention also includes various embodiments not described in this specification. Thus, as can be seen from the disclosure of the invention, the invention is limited only by the inventive matter as set forth in the scope of the patent claims.

What is claimed is:

1. An image decoder for decoding encoded image data in an image block unit, comprising:
    a storage device configured to store a DC component of a past image block coefficient as a prediction value;
    a predict circuit configured to predict a DC component of a current image block coefficient using the prediction value;
    an inversely quantizing circuit configured to inversely quantize an image block coefficient outputted from the predict circuit; and
    a saturation processing circuit to execute a saturation processing of an image block coefficient outputted from the inversely quantizing circuit, wherein a DC component of the image block coefficient outputted from the inversely quantizing circuit and a DC component of the image block coefficient after execution of the saturation processing are respectively inputted to the storage device as the prediction value.

2. The image decoder according to claim 1, wherein the storage device comprises:
    a first prediction value hold circuit configured to hold the DC component of the image block coefficient after execution of the saturation processing as the prediction value; and
    a second prediction value hold circuit configured to hold the DC component of the image block coefficient outputted from the inversely quantizing circuit as the prediction value.

3. The image decoder according to claim 1, wherein the storage device comprises:
    a select circuit configured to select either the DC component of the image block coefficient outputted from the inversely quantizing circuit or the DC component of the image block coefficient after execution of the saturation processing according to a select signal; and
    a prediction value hold circuit configured to hold the DC component selected by the select circuit as the prediction value.

4. The image decoder according to claim 3, comprising:
a kind check circuit configured to check a kind of encoding method used to create the encoded image data in order to generate the select signal.

5. The image decoder according to claim 3, comprising:
a microprocessor configured to execute software for checking the kind of encoding methods used to encode the encoded image data in order to generate the select signal.

6. An image decoding method comprising:
storing a DC component of a past image block coefficient as a prediction value;
predicting, by a predict circuit, a DC component of a current image block coefficient using the prediction value;
inversely quantizing, in an inversely quantizing circuit, an image block coefficient outputted from the predict circuit;
executing saturation processing an image block coefficient outputted from the inversely quantizing circuit; and
inputting to a storage device as the prediction value a DC component of the image block coefficient outputted from the inversely quantizing circuit and a DC component of the image block coefficient after execution of the saturation processing.

7. The image decoding method according to claim 6, comprising:
holding the DC component of the image block coefficient after execution of the saturation processing as the prediction value; and
holding the DC component of the image block coefficient outputted from the inversely quantizing circuit as the prediction value.

8. The image decoding method according to claim 6, comprising:
selecting either the DC component of the image block coefficient outputted from the inversely quantizing circuit or the DC component of the image block coefficient after execution of the saturation processing according to a select signal; and
holding the selected DC component as the prediction value.

9. The image decoding method according to claim 8, comprising:
checking a kind of encoding method used to encode the encoded image data in order to generate the select signal.

* * * * *